US011989436B2

(12) United States Patent
Varadan

(10) Patent No.: US 11,989,436 B2
(45) Date of Patent: May 21, 2024

(54) VARIABLE EXTENT SIZE

(71) Applicant: Hewlett Packard Enterprise Development LP, Houston, TX (US)

(72) Inventor: Srikant Varadan, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/813,075

(22) Filed: Jul. 18, 2022

(65) Prior Publication Data
US 2024/0020041 A1    Jan. 18, 2024

(51) Int. Cl.
*G06F 3/06* (2006.01)
(52) U.S. Cl.
CPC .......... *G06F 3/0644* (2013.01); *G06F 3/0608* (2013.01); *G06F 3/0641* (2013.01); *G06F 3/0673* (2013.01)
(58) Field of Classification Search
CPC .... G06F 3/0644; G06F 3/0608; G06F 3/0641; G06F 3/0673
See application file for complete search history.

(56) References Cited

U.S. PATENT DOCUMENTS

| 9,298,375 | B2 | 3/2016 | Cota-Robles et al. |
| 9,710,317 | B2 | 7/2017 | Gupta et al. |
| 9,798,472 | B1 | 10/2017 | Natanzon et al. |
| 10,157,006 | B1 | 12/2018 | Armangau et al. |
| 10,430,376 | B1 | 10/2019 | Armangau et al. |
| 10,949,107 | B1 | 3/2021 | Basov et al. |
| 2014/0258595 | A1 | 9/2014 | Venkatesha et al. |
| 2017/0220284 | A1* | 8/2017 | Jain ........................ G06F 3/0604 |
| 2020/0042617 | A1 | 2/2020 | Kuang et al. |
| 2020/0142628 | A1 | 5/2020 | Armangau et al. |

FOREIGN PATENT DOCUMENTS

WO   2008/144018 A1   11/2008

* cited by examiner

*Primary Examiner* — Edward J Dudek, Jr.
(74) *Attorney, Agent, or Firm* — Hewlett Packard Enterprise Patent Department

(57) ABSTRACT

Examples described herein relate to selection and variation of extent size thresholds in a storage volume. Examples may select an extent size threshold for a volume according to a type of application that is to store data on the volume. Examples may dynamically vary the extent size threshold based on data reduction metrics, such as deduplication ratio and/or compression ratio. Examples may dynamically vary the extent size threshold for the volume based on cache performance metrics, such as cache miss rate. Examples may dynamically vary the extent size threshold for the volume based on an amount of dead storage space corresponding to partially overwritten extents in the volume.

16 Claims, 11 Drawing Sheets

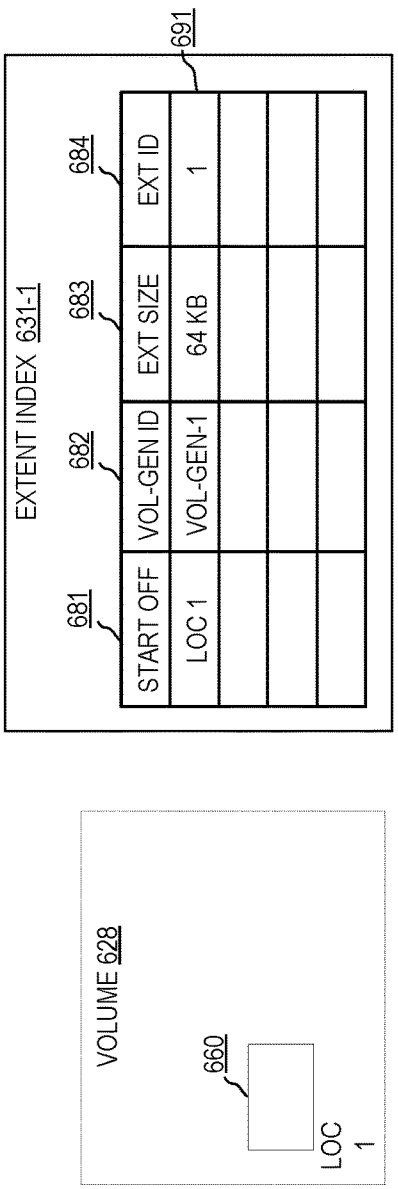
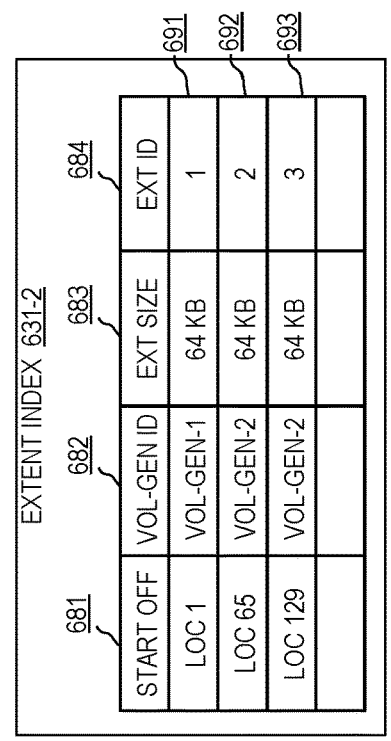
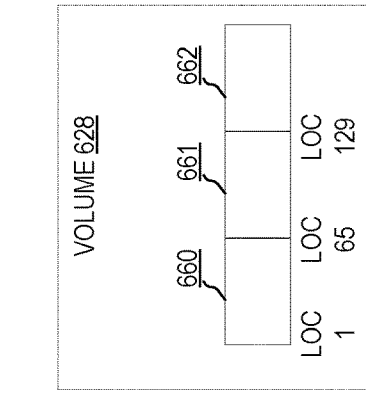
FIG. 6B
FIG. 6C
FIG. 6D
FIG. 6E
FIG. 6F
FIG. 6G

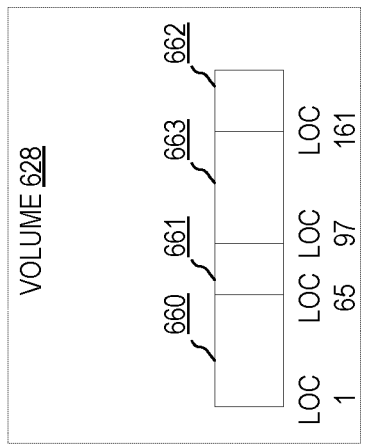
FIG. 6H
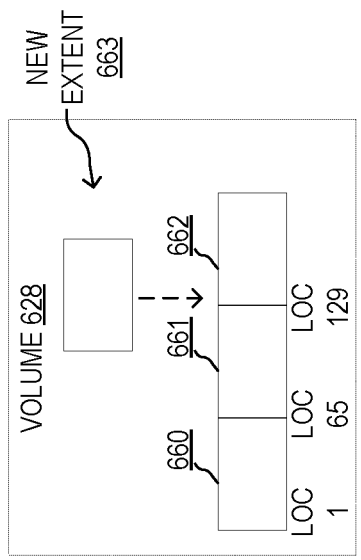
FIG. 6I
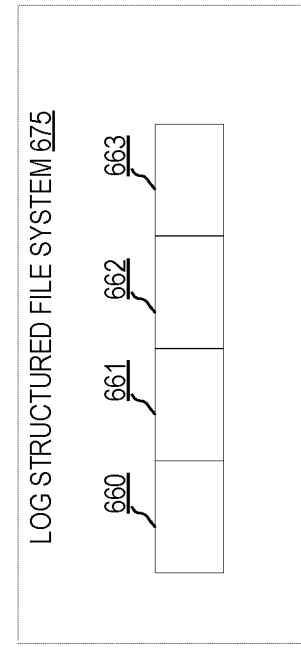
FIG. 6K
FIG. 6J

VARIABLE EXTENT SIZE

BACKGROUND

A computing system, such as a storage system (e.g., a storage array), a server, or the like, may include physical storage device(s) to store data. The storage system may logically represent the data in volumes, such as virtual volumes. The storage system may present such volumes to a client computing device, such as a host server or the like. The client computing device may send input/output (IO) requests (e.g., read/write requests) to the storage system to read data from or write new data to the volume.

BRIEF DESCRIPTION OF THE DRAWINGS

The following detailed description references the drawings, wherein:

FIGS. 6B, 6E, 6H, and 6I depict an example volume at different points in time;

FIGS. 6C, 6F, and 6J depict example extent indexes of respective volume generations created at different epochs;

FIGS. 6D, 6G, and 6K depict an example log-structured file system at different points in time;

DETAILED DESCRIPTION

Figure 1A:
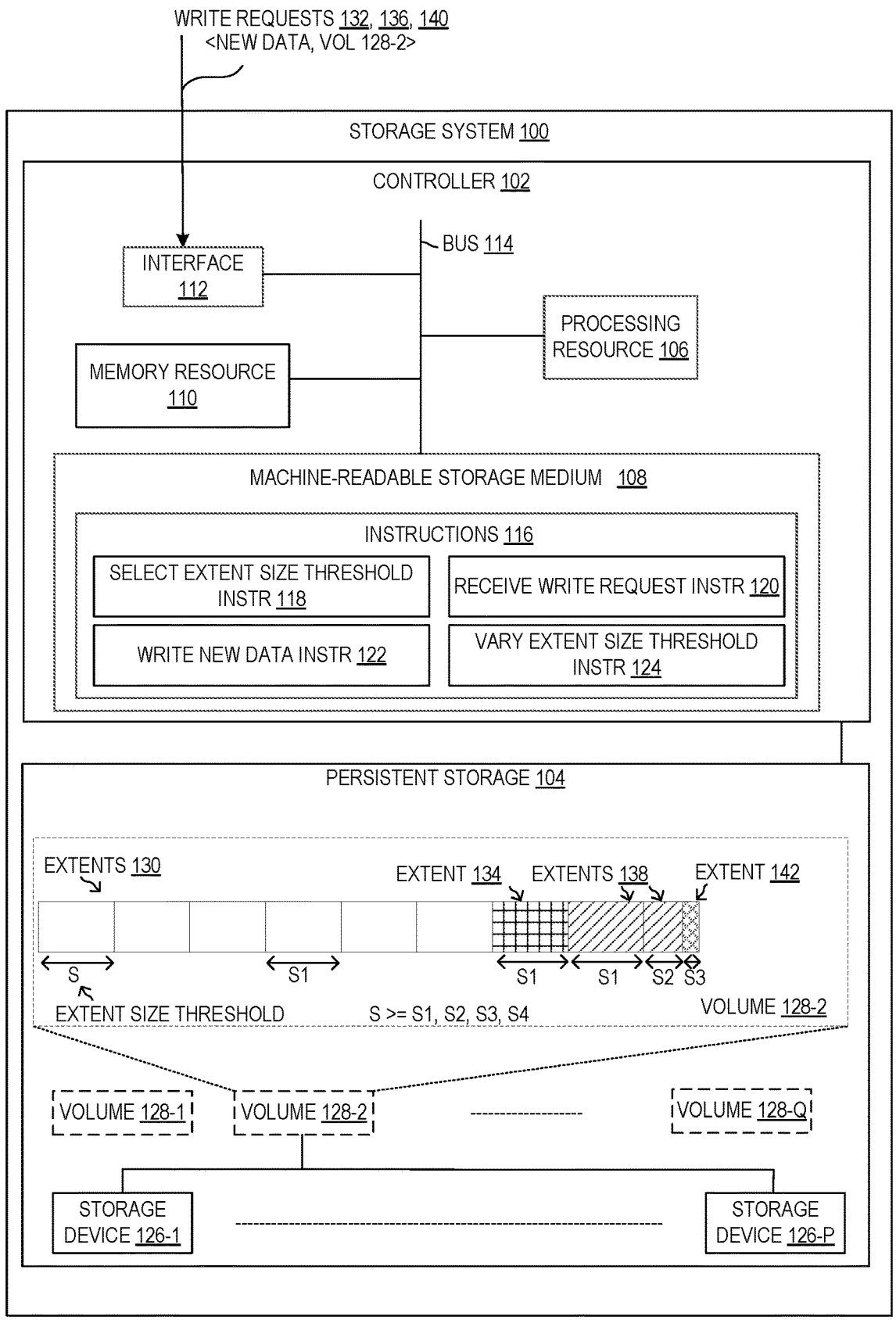
FIG. 1A is a block diagram of an example storage system to vary an extent size threshold for a volume based on data reduction metrics.

A storage system may receive input/output ("IO") requests (e.g., read/write requests) from a host application executing on a client computing device to read data from or write new data to a volume (e.g., a virtual volume) of the storage system. A volume refers to a logical unit of storage for storing data in a storage system (e.g., on physical storage media of the storage system). Each volume may include a logical address space (e.g., logical addresses or offsets) for locating, populating, and accessing the data in the volume. A portion of the logical address space refers to a subset of the logical address space comprising one or more regions of storage space addressed by one or more logical addresses in the logical address space.

As used herein, a block refers to a fixed-size unit of data (e.g., 1 KB, 4 KB, or 8 KB) defined for a volume as the unit of alignment to be used internally by a storage system for IO to and from storage media (e.g., physical storage device(s)) for the volume. For a volume with a defined block size, reads from and writes to storage media underlying the volume are performed in units of one or more blocks and aligned to block boundaries (for storage media other than byte-addressable storage media). For such a volume, metadata may be maintained for each block (i.e., at the block level), regardless of the sizes of reads and writes targeted to the volume. When a storage system receives data to be written to a volume, the data may be segmented into smaller data units. Each data unit may be written as a block (of the fixed block size) to the volume. For example, to write 32 KB of data to a volume, with a defined block size of 4 KB, the data may be segmented into smaller data units of 4 KB and written as blocks to the volume.

As used herein, "extents" are variable-sized, contiguous units of data to be used internally by a storage system for IO to and from storage media without maintaining alignment to any fixed-size unit of data (e.g., blocks). In such examples, the storage system maintains metadata for each extent (i.e., at the extent level). For a volume that allows reading and writing of variable-sized extents (without maintaining alignment to any fixed-size unit of data), the extent size of extents written to the volume may vary based on the amount of data to be written to the volume in response to respective write requests. For example, when the storage system receives a write request to write 256 KB of data to a volume, the storage system may write the data to the volume as a single 256 KB extent. The size of an extent may be referred to herein as the "extent size" of that extent.

Different extent sizes may have different advantages and disadvantages. For example, when relatively small extents (e.g., 8 KB) are used, storage systems may achieve better deduplication performance, while large extents may result in poorer deduplication performance (as smaller amounts of duplicative data may be contained within larger non-duplicative extents). However, when relatively large extents (e.g., 256 KB) are used, the storage systems may achieve better compression performance and store relatively less metadata.

In some examples, writing data as relatively large extents may lead to a relatively large amount of "dead" storage space, as described below. Extents may be written to a logical address space as part of different volume generations. A volume generation (or "vol-gen" herein) refers to a set of data and metadata associated with extents written to a volume during a given epoch. As an example, a first extent may be written to a first portion of a logical address space as part of an earlier vol-gen, and a second extent may be written to a second portion of the logical address space as part of a later vol-gen. In such examples, when the second portion of the second extent overlaps with some (but not all) of the first portion of the first extent in the logical address space, the first extent may be considered a "partially overwritten extent" during and after the later vol-gen. A partially overwritten extent includes an overwritten fragment (i.e., where the first and second portions of the logical address space overlap) and a non-overwritten fragment (i.e., where the first and second portions of the logical address space do not overlap). As used herein, a "fragment" is a sub-region of an extent. The overwritten fragments may not be erased from persistent storage (e.g., via a garbage collection process) because the non-overwritten fragment of the partially overwritten extent is still contained in the volume. The overwritten fragments of partially overwritten extents in a volume may be considered "dead" storage space in the persistent storage. More generally, dead storage space refers to storage space populated with data of an earlier vol-gen that is logically overwritten with respect to a later vol-gen. The dead storage space may be a waste of storage capacity of the storage system.

Large extents may also have disadvantages for caching performance. For example, a storage system may cache hot data (i.e., data frequently targeted by read requests) in a cache memory (e.g., a read cache) to process read requests efficiently. In examples using large extents, the storage system may cache extents, and in particular extents that include hot data. However, such cached extents may also include cold data (i.e., data not frequently targeted by the read requests) along with the hot data. When relatively large extents are used, a cached extent may occupy a relatively large amount of space in the cache for the sake of relatively small amounts of hot data contained within the cached extent, which may lead to less hot data overall being present in the cache at a given time. In such examples, a significant amount memory resources may be used inefficiently and the overall cache miss rate (i.e., ratio of total cache misses and the total number of read requests) associated with the cache memory may increase significantly, since less of the hot data may be maintained in the cache at the same time when the data is cached and evicted as relatively large extents.

In contrast, there may also be disadvantages to reading from and writing to a volume using relatively small extents. For example, writing data as relatively small extents may reduce the effectiveness of compression, as it is difficult to represent relatively small amounts of data more compactly (e.g., using a shorter representation of a longer pattern of 0's and 1's). As a result, compression is generally more effective on large amounts of data. Further, data from certain types of host applications (e.g., database applications) may not benefit much from deduplication, but may benefit more from compression instead. For example, data written by database applications may include key-value mappings, where a key identifies a unique value, i.e., unique units of the data that may have relatively few or no duplicate copies. As a result, deduplication of data from database applications may not be effective to reduce size of the data. In such examples, it may be more advantageous to write data to a volume in relatively large extents (more suitable for compression than deduplication), rather than breaking the data into smaller units.

To address these issues, examples described herein may select an extent size threshold for a volume based on the type of application writing data to the volume. On receiving a write request to write new data to the volume, the new data may be written as one or more extents no larger than the extent size threshold in place at the time of writing the new data. Some examples may include dynamically varying the extent size threshold based on data reduction metrics, such as deduplication ratio or compression ratio (or both), associated with the volume.

In this manner, examples described herein may select an appropriate extent size threshold for a volume based on applications writing data to the volume and the data reduction metrics to achieve better data reduction. For example, data written by certain host applications, such as database applications, may achieve better data reduction via compression than deduplication. By selecting a larger extent size threshold for volumes that store data from such types of applications, examples described herein may achieve improved data reduction via compression. As a result, selecting the extent size threshold based on the type of application may improve data reduction for data from various different types of applications, which may lead to significant savings in storage space.

Similarly, dynamically varying the extent size threshold based on one or more of observed compression ratios or observed deduplication ratios associated with a volume may significantly improve data reduction for the volume. For example, for a given volume, if the deduplication ratio is poor (e.g., below a threshold range), then the extent size threshold may be decreased. By decreasing the extent size threshold, new data may be written to the volume as smaller extents, which may improve the deduplication ratio. Similarly, if the compression ratio is below a threshold range, then the extent size threshold may be increased. By increasing the extent size threshold, new data may be written to the volume as larger extents, which may improve the compression ratio.

As described above, extent sizes may also affect the performance of a read cache. To address these issues, examples described herein may also dynamically vary an extent size threshold based on observations related to processing of read requests. In some examples, various read requests may request data in fragments smaller than the extents in which the data is stored in a volume. Examples described herein may determine, for respective read requests, the ratio of the size of the fragment of data (fragment size) requested by the read request to the size of the extent including the requested data (extent size). This ratio may be referred to herein as a "read ratio" for a read request. Examples described herein may also determine a cache miss rate associated with a read cache of the storage system, and may dynamically vary the extent size threshold for the volume based on observed read ratios and an observed cache miss rate. For example, if the read ratio (of the fragment size to the extent size) is relatively small (i.e., read requests are requesting relatively small amounts of data from within relatively large extents) and the cache miss rate is relatively large, then the extent size threshold may be decreased.

By decreasing the extent size threshold in this manner, new data may be written to the volume as smaller extents so that caching these smaller extents may result in relatively small amount of cold data being cached (compared to caching the larger extents). Caching smaller amount of cold data in this manner, may lead to more hot data being cached, which may in turn reduce the cache miss rate. In other examples, if the read ratio is relatively large and the cache miss rate is relatively small, then the extent size threshold may be increased as long as cache miss rate is within a desired range. By increasing the extent size threshold in this manner, new data may be written as relatively large extents, which may reduce the amount of extent metadata to be stored in the storage system. As a result, the storage system may save significant storage capacity.

As described above, extent sizes, particularly large extent sizes, may increase dead storage space leading to inefficient utilization of storage capacity in storage systems. To address these issues, examples described herein may maintain an extent index for a respective vol-gen of a volume. The extent index for a given vol-gen stores extent metadata for each extent associated with the vol-gen. When a write request to write new data to the volume is received, examples described herein may write the new data as one or more new extents to a first portion of a logical address space as part of a new vol-gen. Examples described herein may generate new extent metadata for the one or more new extents. Based on the new extent metadata and extent index for a preceding vol-gen, examples described herein may identify partially overwritten extent(s) located at a second portion of the logical address space as part of a previous vol-gen, such that the first and second portions of the logical address space overlap. Based on the new extent metadata and extent index for a preceding vol-gen, examples may also identify overwritten fragment(s) of the partially overwritten extent(s). Examples described herein may determine an amount of dead storage space based on a cumulative size of the overwritten fragment(s) in the volume. Examples described herein may dynamically vary the extent size threshold according to the amount of dead storage space. For example, if the amount of dead storage space is relatively large, the storage systems may decrease the extent size threshold.

By decreasing the extent size threshold in this manner, new data may be written as relatively small extents as part of different vol-gens of the volume. Due to such smaller extents, a relatively higher number of extents of earlier vol-gens may fully overlap with extents of later vol-gens of that volume. In such instances, extents of the earlier vol-gens that fully overlap with extents of later vol-gens may be considered as fully overwritten extents. Increasing the number of fully overwritten extents and reducing the number of partially overwritten extents in this manner, may lead to larger amount of overwritten data to be erased (e.g., via a garbage collection process) from persistent storage. As a result, a relatively large amount of storage space in the persistent storage may be freed and the amount of dead storage space may be significantly reduced. In other examples, if the amount of dead storage is relatively small, the storage systems may increase the extent size threshold. By increasing the extent size threshold in this manner, new data may be written in larger extents, which may reduce the amount of extent metadata to be stored in the storage system. As a result, the storage system may save significant storage capacity.

FIG. 1A is a block diagram of a storage system 100 to vary an extent size threshold for a volume based on data reduction metrics. The storage system 100 may be implemented by a computing system (such as a storage array, a server, a backup appliance, a hyperconverged system, or the like) including at least one controller 102 and persistent storage 104. The storage system 100 may be in communication with one or more client computing devices, such as host servers, via one or more computer network(s).

Although, for illustrative purposes, FIG. 1A shows a single controller 102, the storage system 100 may include any suitable number of controllers. The controller 102 may include a processing resource 106, a machine-readable storage medium 108, a memory resource 110, and a network interface device 112. Hardware components of the controller 102 may communicate with one another over one or more busses 114. The machine-readable storage medium 108 may store (e.g., be encoded with) a plurality of instructions 116 that are executable by the processing resource 106 to implement functionalities described herein. The instructions 116 of the machine-readable storage medium 108 may include instructions 118, 120, 122, and 124.

In examples described herein, the memory resource 110 may be any suitable type of volatile or non-volatile memory, and may be implemented by one or more physical memory devices (e.g., Dynamic Random Access Memory (DRAM), dual-inline memory modules (DIMMs), or the like). In examples described herein, the network interface device 112 may be any suitable hardware device for communicating on a computer network, such as a storage area network (SAN). For example, the network interface device 112 may be a network interface card (NIC), a fibre channel host-bus adapter (FC HBAs), or the like, to communicate over one or more computer networks.

In the example of FIG. 1A, the controller 102 may have a physical connection to the persistent storage 104 (e.g., through cables, or other communication channel(s)). The persistent storage 104 may include storage media, such as storage devices 126-1 to 126-P (where "P" is an integer greater than or equal to 1). The storage devices 126-1 to 126-P may be non-volatile storage devices, such as hard disk drives (HDDs), solid state drives (SSDs) (e.g., flash drives), or other suitable devices to store data in a non-volatile manner. In some examples, the persistent storage 104 may include any combination of one or more of any such non-volatile storage devices.

In some examples, the data stored on one or more of the storage devices 126-1 to 126-P is virtually represented in the form of one or more volumes 128-1 to 128-Q, (where "Q" is an integer greater than or equal to 2). The controller 102 may present the volumes 128-1 to 128-Q to one or more client computing devices (e.g., host servers) coupled to the storage system 100. Each volume may include a logical address space backed by one or more of the storage devices 126-1 to 126-P such that the data may be stored to one or more of the storage devices 126-1 to 126-P via writing to the logical address space of the volume.

In examples described herein, data may be written to a volume as one or more extent(s), and metadata may be maintained for each extent (i.e., at the extent level). In the example of FIG. 1A, data may be written to volume 128-2 as extents 130.

Figure 1B:
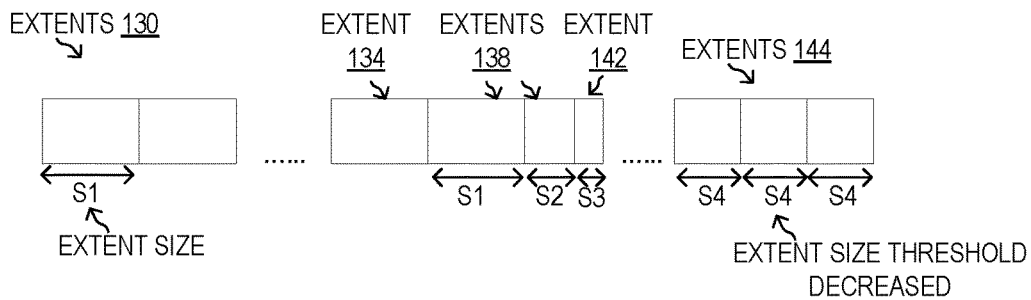
FIGS. 1B-1E depict example extents and variation in the extent size threshold.
Figure 1C:
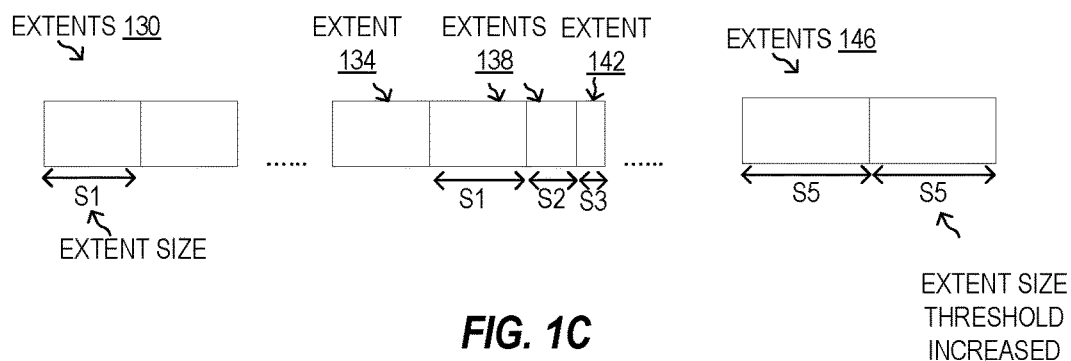
Figure 1D:
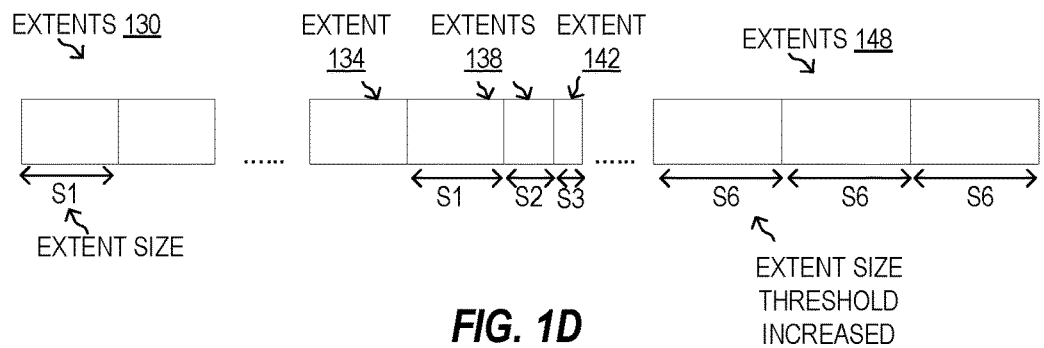
Figure 1E:
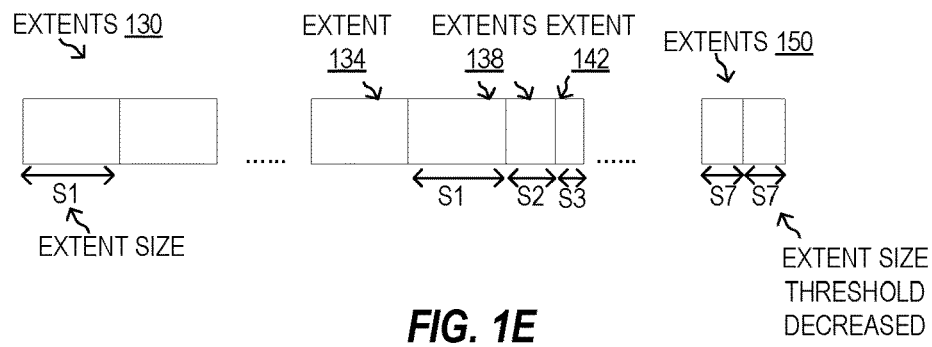
Figure 2A:
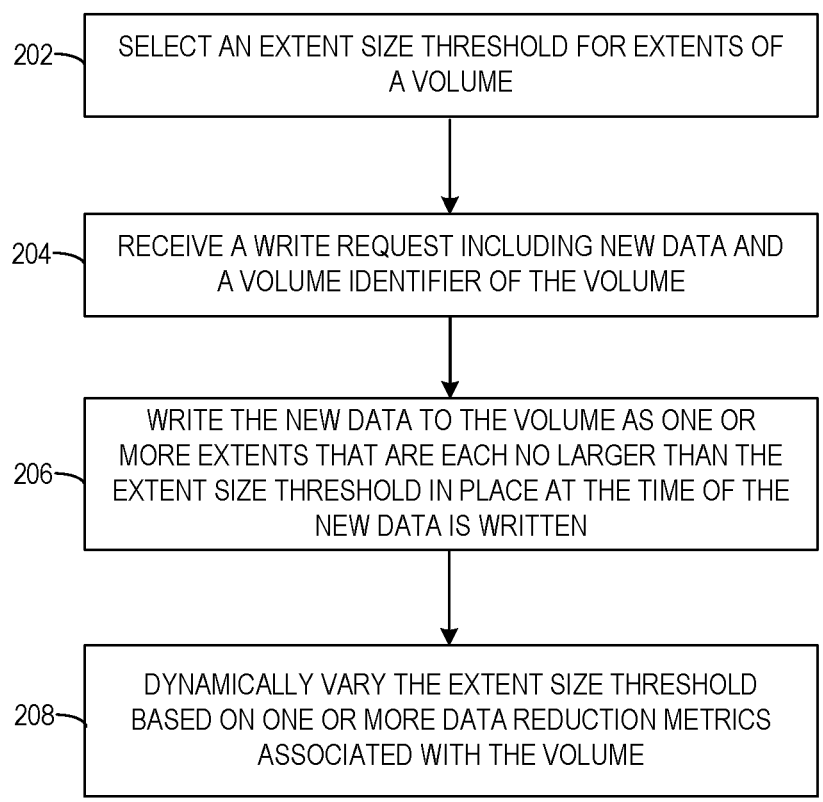
FIG. 2A is a flowchart of an example method to vary the extent size threshold based on data reduction metrics.

Examples of varying extent size threshold for a volume based on data reduction metrics are described herein in relation to FIGS. 1A, 1B, 1C, 1D, 1E, 2A, 2B, 2C, and 2D. FIGS. 1B-1E depict variation in an extent size threshold for a volume. FIG. 2A is a flowchart of an example method 200 to vary an extent size threshold for a volume according to data reduction metrics associated with the volume.

At 202 of method 200, the processing resource 106 may execute instructions 118 to select an extent size threshold for a volume. The selection is based on a type of application that is to store data on the volume. The type of application (referred to as "application type" herein) that is to store data on the volume refers to a category of applications (e.g., database applications, virtual machine file system (VMFS) applications, etc.) that write a specific type of data to the volume. Each type of data may have different characteristics. For example, data written by a database application may include key-value mappings, where the key identifies a unique value (i.e., unique data content), while data written by other applications, such as VMFS applications, may not include such key-value mappings.

A given volume may be configured with a particular application type while creating the volume (e.g., by a storage administrator). In the example of FIG. 1A, the storage administrator may select a VMFS application type to associate with volume 128-1 and may select a database application type to associate with volume 128-2. The processing resource 106 may select respective extent size thresholds for each volume based on the application type selected for that volume. For example, the processing resource 106 may select a relatively large extent size threshold for volumes storing data written by database applications because such data is less amenable to deduplication (i.e., data that includes relatively fewer duplicate or redundant pieces of data). In other examples, the processing resource 106 may select a relatively small extent size threshold for data written by VMFS applications because such data is more amenable to deduplication (i.e., data that includes relatively more duplicate or redundant pieces of data). Table 1 depicts a list of example extent size thresholds for volumes associated with different application types.

TABLE 1

| Application type | Extent size threshold |
|---|---|
| Database | 64 KB |
| Virtual Machine File System (VMFS) | 8 KB |
| Default | 8 KB |

As depicted in Table 1, the extent size threshold for a volume that stores data written by database applications may be 64 KB; the extent size threshold for a volume that stores data written by VMFS applications may be 8 KB; and the extent size threshold for a volume that stores data written by other types of applications may be 8 KB (e.g., a default extent size threshold).

In the example of FIG. 1A, the processing resource 106 may execute instructions 118 to select 64 KB as the extent size threshold S for the volume 128-2 because volume 128-2 stores data from a database applications, for example. In such examples, by selecting a relatively large extent size threshold S (i.e., 64 KB), the volume 128-2 may store data as relatively large extents and achieve better compression performance. As data written by database applications may not be amenable to achieving a high deduplication ratio, the volume 128-2 may not experience changes (e.g., loss or gain) in deduplication performance by using relatively large extents. Additionally, storing data as relatively large extents may reduce the number of extents and associated metadata for each extent stored in the storage system. By selecting extent size thresholds in this manner, the storage system 100 may achieve savings in storage capacity.

At 204, the processing resource 106 may execute instructions 120 to receive a write request 132 from a client computing device (e.g., a host server). For example, the network interface device 112 of the storage system 100 may receive the write request 132. In the example of FIG. 1A, the write request 132 may specify a volume identifier of the volume 128-2 and new data to be written to the volume 128-2. The write request 132 may also specify a logical address (e.g., offset(s)) in the volume 128-2 where the new data is to be written. In some examples, the processing resource 106 may perform data reduction operations, such as deduplication and/or compression, on data specified in each write request received, to compactly store the data in the storage system 100. After the data reduction operations, the processing resource 106 may buffer the data in the memory resource 110.

At 206, the processing resource 106 may execute instructions 122 to write the new data specified in the write request 132 to volume 128-2 as one or more extent(s). The one or more extent(s) may not be larger than the extent size threshold S in place for volume 128-2 at the time of writing the new data. For example, the new data written to volume 128-2 as extent(s) may not be larger than 64 KB (extent size threshold S at the time the new data is written). In the example of FIG. 1A, the new data may be written as an extent 134 beginning at start offset specified in the write request 132. Extent size S1 of the extent 134 may not be greater than 64 KB as specified by the extent size threshold S. In some examples, the processing resource 106 may segment the new data into smaller data units, and store each data unit as a separate extent (e.g., if the new data is greater than the extent size threshold). To determine the number of data units and extents, the processing resource 106 may execute the method described in relation to FIG. 2B (described later).

At 208, the processing resource 106 may execute instructions 124 to dynamically vary the extent size threshold based on one or more data reduction metrics associated with the volume. The data reduction metrics may include deduplication ratio, compression ratio, or the like. The deduplication ratio may refer to a ratio of a size of data specified in a write request to a size of a deduplicated version of that data. The compression ratio refers to a ratio of a size of data specified in a write request to a size of a compressed version of that data.

The processing resource 106 may monitor the deduplication ratio and/or the compression ratio associated with a volume. The processing resource 106 may adjust the extent size threshold for the volume if the deduplication ratio or the compression ratio are not within an expected range of values. The processing resource 106 may execute method described in relation to FIGS. 2C and 2D to vary the extent size threshold for a volume based on deduplication ratio and compression ratio, respectively.

Figure 2B:
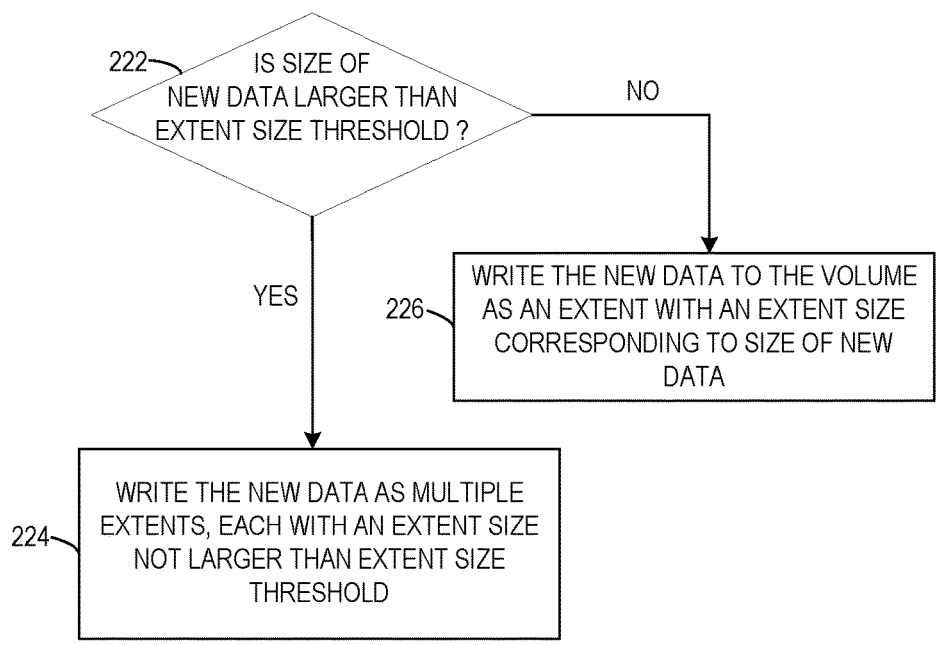
FIG. 2B is a flowchart of an example method to determine a number of extents to write data specified in a write request.

FIG. 2B is a flowchart of an example method 220 to determine a number of extents for writing data specified in a write request. The method 200 may include steps 222, 224, and 226. A processing resource, such as the processing resource 106 may perform the steps 222, 224, and 226 by executing instructions of instructions 116. At 222, the processing resource 106 may determine whether size of new data specified in a write request is larger than an extent size threshold for a volume. For example, as depicted in FIG. 1A, the processing resource 106 may receive write request 136 to write new data to the volume 128-2. The size of the new data may be 100 KB and the extent size threshold for the volume 128-2 may be 64 KB.

In response to determining that the size of the new data (100 KB) is larger than the extent size threshold S (64 KB) for the volume 128-2 ("YES" at 222), the method proceeds to 224. At 224, the processing resource 106 may write the new data as multiple extents. Each of the multiple extents may have an extent size not greater than the extent size threshold. For example, the new data of 100 KB may be written as two extents, where one extent may be 64 KB (equal to the extent size threshold) and other extent may be 36 KB (smaller than the extent size threshold). In the example of FIG. 1A, the extents 138 depict the two extents with sizes S1 and S2. Size S1 may correspond to 64 KB and size S2 may correspond to 36 KB.

Referring back to FIG. 2B, the processing resource 106 may determine that the size of new data specified in write request 140 is 8 KB, in another example. In response to determining that the size of the new data (8 KB) is not larger than the extent size threshold (64 KB) for the volume 128-2 ("NO" at 222), the method proceeds to 226. At 226, the processing resource 106 may write the new data as a single extent with an extent size equivalent to the size of the new data. In such an example, the processing resource 106 may write the new data as an extent with an extent size of 8 KB. In the example of FIG. 1A, the extent 142 depicts the extent with size S3, which may correspond to 8 KB.

Figure 2C:
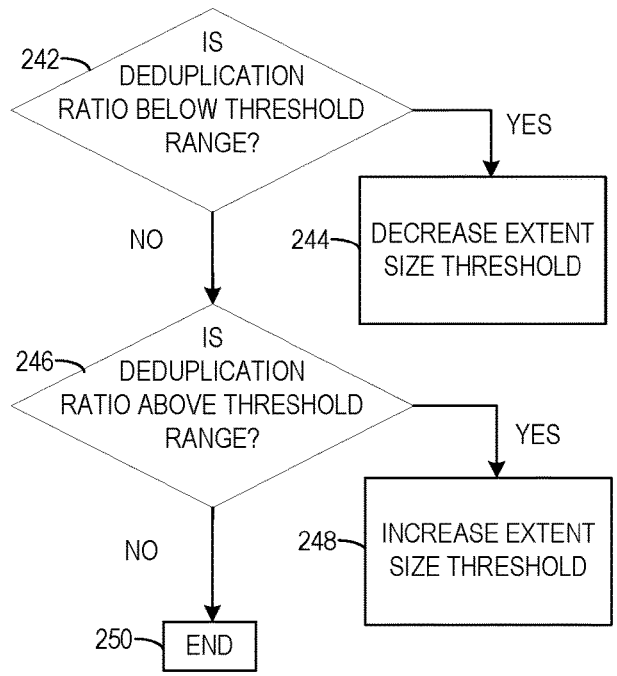
FIG. 2C is a flowchart of an example method to vary the extent size threshold based on a deduplication ratio.

FIG. 2C is a flowchart of an example method 240 to vary the extent size threshold based on a deduplication ratio associated with a volume, such as volume 128-2 of FIG. 1A. The method 240 may include steps 242, 244, 246, 248, and 250. A processing resource, such as the processing resource 106 may perform the steps 242, 244, 246, 248, and 250 by executing instructions of instructions 116.

The processing resource 106 of the storage system 100 may monitor the deduplication ratio associated with each volume of the storage system 100. The deduplication ratio associated with a volume may be a ratio of size of data (i.e., raw or undeduplicated data) to be written to the volume and the size of corresponding deduplicated version of the data. The processing resource 106 may determine the deduplication ratio associated with a volume by computing, for a plurality of writes, an average of the ratio of the size of the raw data to be written to the volume to the size of the deduplicated version of the data. At 242, the processing resource 106 may determine whether the deduplication ratio is below a threshold range or not. In some examples, the threshold range of values for the deduplication ratio associated with the volume 128-2 may be 1.1:1 to 1.3:1.

In an example, the processing resource 106 may determine that the deduplication ratio is 1:1, which indicates that the size of the raw data to be written is equivalent to the size of deduplicated version of the data. In response to determining that the deduplication ratio is below the threshold range, i.e., 1.1:1 to 1.3:1, the method proceeds to 244 ("YES" at 242). At 244, the processing resource 106 may decrease the extent size threshold by a predetermined value. The predetermined value may be 32 KB, for example. In such examples, the extent size threshold for the volume 128-2 may be decreased from 64 KB to 32 KB. FIG. 1B depicts the extents written to the volume 128-2 after decreasing the extent size threshold. The storage system 100 may write new data (e.g., specified in a new write request) as extents 144 with a maximum extent size S4 of 32 KB. As noted earlier, S1, S2, and S3, represent the extent size of extents as described in relation to FIG. 1A. By reducing the extent size threshold for volumes in this manner, the storage system 100 may store new data as smaller extents. Storage systems may improve the deduplication ratio for the volumes and reduce the number of duplicate copies of data stored in the persistent storage 104.

Referring back to FIG. 2C, at 242, the processing resource 106 may determine that the deduplication ratio is 1.4:1, in another example. Deduplication ratio of 1.4:1 indicates that the size of the raw data to be written is 1.4 times the size of deduplicated version of the data. In response to determining that the deduplication ratio is not below the threshold range, i.e., 1.1:1 to 1.3:1, the method proceeds to 246 ("NO" at 242).

At 246, the processing resource 106 may determine whether the deduplication ratio is above the threshold range or not. For example, the processing resource 106 may determine that the deduplication ratio (1.4:1) is greater than the threshold range of values of the deduplication ratio (1.1:1 to 1.3:1). In response to determining that the deduplication ratio is above the threshold range ("YES" at 246), the method proceeds to 248. At 248, the processing resource 106 may increase the extent size threshold (64 KB) by a predetermined value. The predetermined value may be 32 KB, for example. In such examples, the extent size threshold for the volume 128-2 may be increased from 64 KB to 96 KB. FIG. 1O depicts the extents written to the volume 128-2 after increasing the extent size threshold. The storage system 100 may write new data as extents 146 with a maximum extent size S5 of 96 KB. By increasing the extent size threshold for volumes in this manner, the storage system 100 may store new data as larger extents, which may reduce the number of extents and associated metadata stored in the persistent storage 104.

Referring back to FIG. 2C, in another example, the processing resource 106 may determine that the deduplication ratio is 1.2:1, for example. In response to determining that the deduplication ratio is not above and within the threshold range, i.e., 1.1:1 to 1.3:1, the method proceeds to 250 ("NO" at 246). At 250, the processing resource 106 may not perform any action, i.e., the processing resource 106 may not vary the extent size threshold for the volume.

Figure 2D:
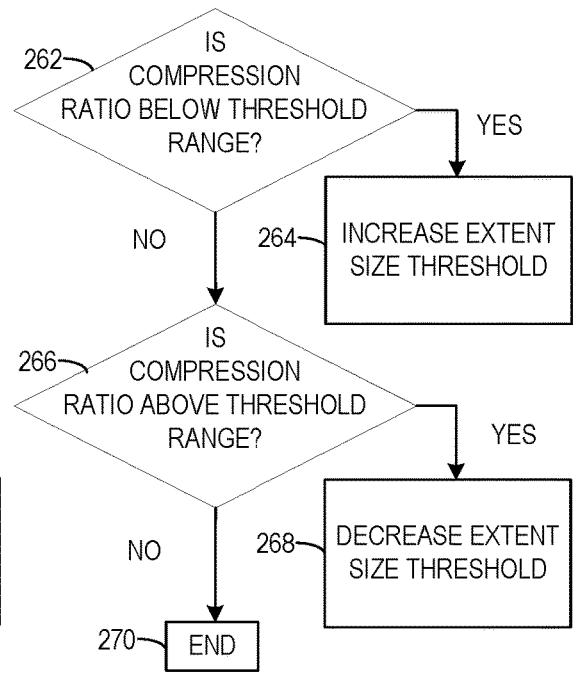
FIG. 2D is a flowchart of an example method to vary the extent size threshold based on a compression ratio.

FIG. 2D is a flowchart of an example method 260 to vary the extent size threshold based on a compression ratio associated with the volume, such as volume 128-2 of FIG. 1A. The method 260 may include steps 262, 264, 266, 268, and 270. A processing resource, such as the processing resource 106 may perform the steps 262, 264, 266, 268, and 270 by executing instructions of instructions 116.

The processing resource 106 of the storage system 100 may monitor the compression ratio associated with each volume of the storage system 100. For example, the processing resource 106 may determine a ratio of size of raw data to be written to the volume and the size of a compressed version of the data. The processing resource 106 may determine the compression ratio by computing, for a plurality of write requests, an average of the ratio of the size of the raw data to be written and the size of a compressed version of the data. At 262, the processing resource 106 may determine whether the compression ratio is below a threshold range or not. In some examples, the threshold range of values for compression ratio associated with the volume 128-2 may be 3.9:1 to 4.1:1.

In an example, the processing resource 106 may determine that the compression ratio is 3.7:1, which indicates that the size of the raw data to be written to the volume 128-1 is 3.7 times the size of the corresponding compressed version of the data. In response to determining that the compression ratio (3.7:1) is below the threshold range, i.e., 3.9:1 to 4.1:1, the method proceeds to 264 ("YES" at 262). At 264, the processing resource 106 may increase the extent size threshold (64 KB) by a predetermined value. The predetermined value may be 48 KB, for example. In such examples, the extent size threshold for the volume 128-2 may be increased from 64 KB to 112 KB. FIG. 1D depicts the extents written to the volume 128-2 after increasing the extent size threshold. The storage system 100 may write the data as extents 148 with a maximum extent size S6 of 112 KB. By increasing the extent size threshold for volumes in this manner, the storage system 100 may store new data in larger extents. As a result, the storage system 100 may improve the compression ratio for the volume and achieve significant savings in storage space.

Referring back to FIG. 2D, at 262, in another example, the processing resource 106 may determine that the compression ratio is 4.3:1, which indicates that the size of the raw data to be written to the volume 128-1 is 4.3:1 times the size of corresponding compressed version of the data. In response to determining that the compression ratio is not below the threshold range, i.e., 3.9:1 to 4.1:1, the method proceeds to 266 ("NO" at 262).

At 266, the processing resource 106 may determine whether the compression ratio is above the threshold range or not. For example, the processing resource 106 may determine that the compression ratio (4.3:1) is greater than the threshold range of values of the deduplication ratio (3.9:1 to 4.1:1). In response to determining that the compression ratio is above the threshold range, the method proceeds to 268 ("YES" at 266).

At 268, the processing resource 106 may decrease the extent size threshold by the predetermined value (48 KB). In such examples, the extent size threshold for the volume 128-2 may be decreased from 64 KB to 16 KB. FIG. 1E depicts the extents of the volume 128-2 after decreasing the extent size threshold. The storage system 100 may write the data as extents 150 with a maximum extent size S7 of 16 KB. By decreasing the extent size threshold in this manner, the storage system 100 may store new data in smaller extents, which may also improve deduplication ratio for the volume.

Referring back to FIG. 2D, at 266, the processing resource 106 may determine that the compression ratio is 4:1, in another example. In response to determining that the compression ratio is within the threshold range ("NO" at 266), the method proceeds to 270. At 270, the processing resource 106 may not perform any action, i.e., the processing resource 106 may not vary the extent size threshold.

In some examples, the processing resource 106 may vary the extent size threshold for the volume based on both deduplication ratio and compression ratio. For example, the processing resource 106 may execute the methods 240 and 260 to vary the extent size threshold. In some examples, the processing resource 106 may iteratively execute the methods 240 and 260 to optimize both the deduplication and compression ratios, for example.

Figure 3:
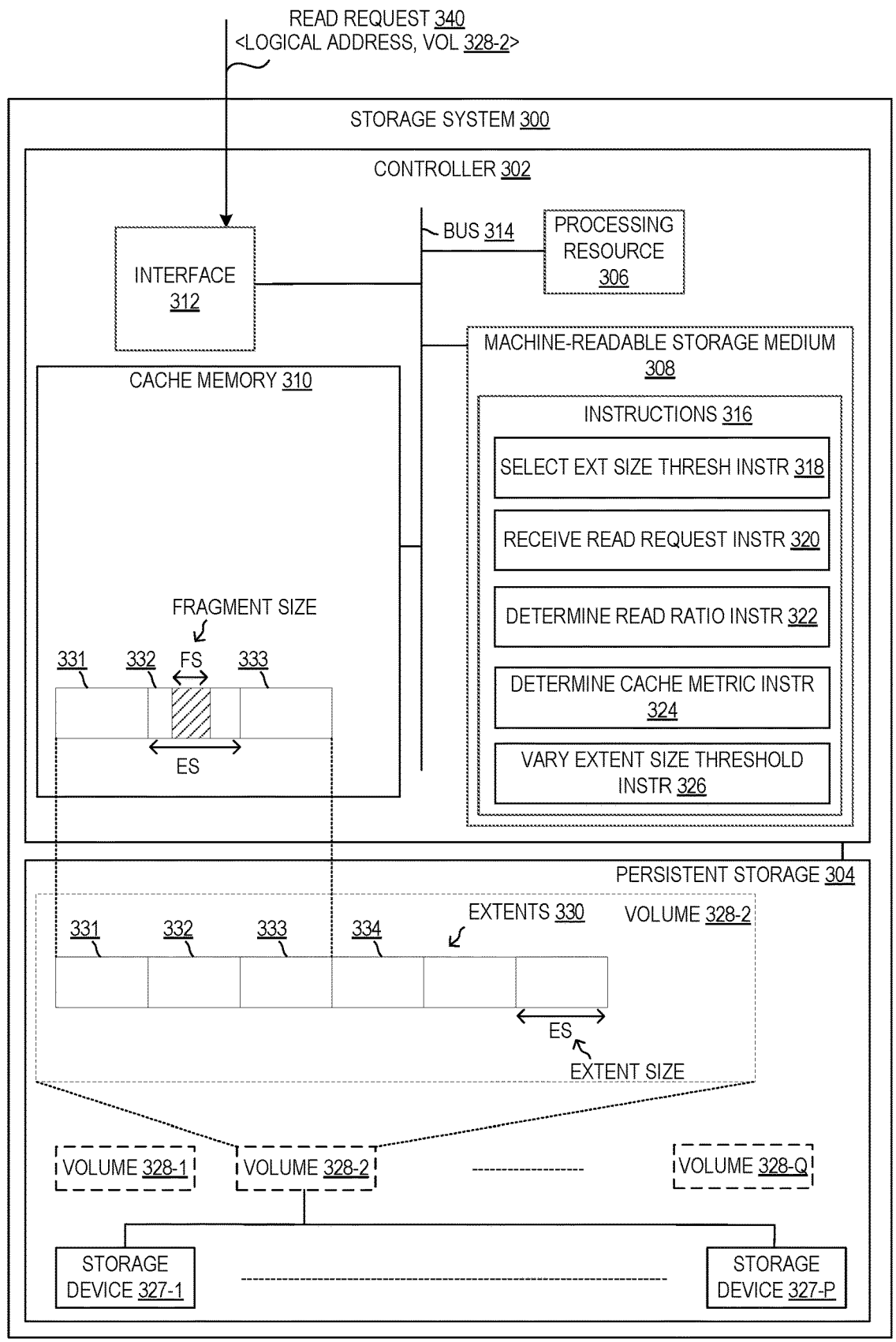
FIG. 3 is a block diagram of an example storage system to vary the extent size threshold for a volume based on a cache miss rate and average read ratio.

FIG. 3 is a block diagram of an example storage system 300 to vary extent size threshold for a volume based on cache miss rate. In the example of FIG. 3, the storage system 300 may include a controller 302 and persistent storage 304. Controller 302 and persistent storage 304 are analogous to controller 102 and persistent storage 104 of FIG. 1A, respectively. As depicted in FIG. 3, the controller 302 may include a processing resource 306, a machine-readable storage medium 308, a cache memory 310, a network interface device 312, and one or more busses 314. The cache memory 310 may be implemented by one or more physical memory devices (e.g., DRAM, DIMMs, or the like). In some examples, the cache memory 310 may be a read cache, which stores a copy of data stored in the persistent storage 304.

In the example of FIG. 3, the machine-readable storage medium 108 may store (e.g., be encoded with) a plurality of instructions 316 that are executable by the processing resource 306 to implement functionalities described herein. For example, the instructions 316 of the machine-readable storage medium 308 may include instructions 318, 320, 322, 324 and 326.

In some examples, the data stored on one or more of the storage devices 327-1 to 327-P of the persistent storage 304 is virtually contained in the form of one or more volumes 328-1 to 328-Q, (where "Q" is an integer greater than or equal to 2). The controller 302 may present the volumes 328-1 to 328-Q to client computing devices (e.g., host servers) coupled to the storage system 300.

In the example of FIG. 3, data may be written to the volume 328-2 as extents 330. Some of the extents 330 may include hot data, which refers to data that is frequently targeted by read requests. To allow relatively efficient processing of read requests, the processing resource 306 may store extents including the hot data in the cache memory 310. The extents including the hot data may also include cold data, which refers to data that is not frequently targeted by read requests. In the example of FIG. 3, the processing resource 306 may identify some fragments of extents 331, 332, 333 containing hot data and store the extents 331, 332, 333 in the cache memory 310.

Figure 4:
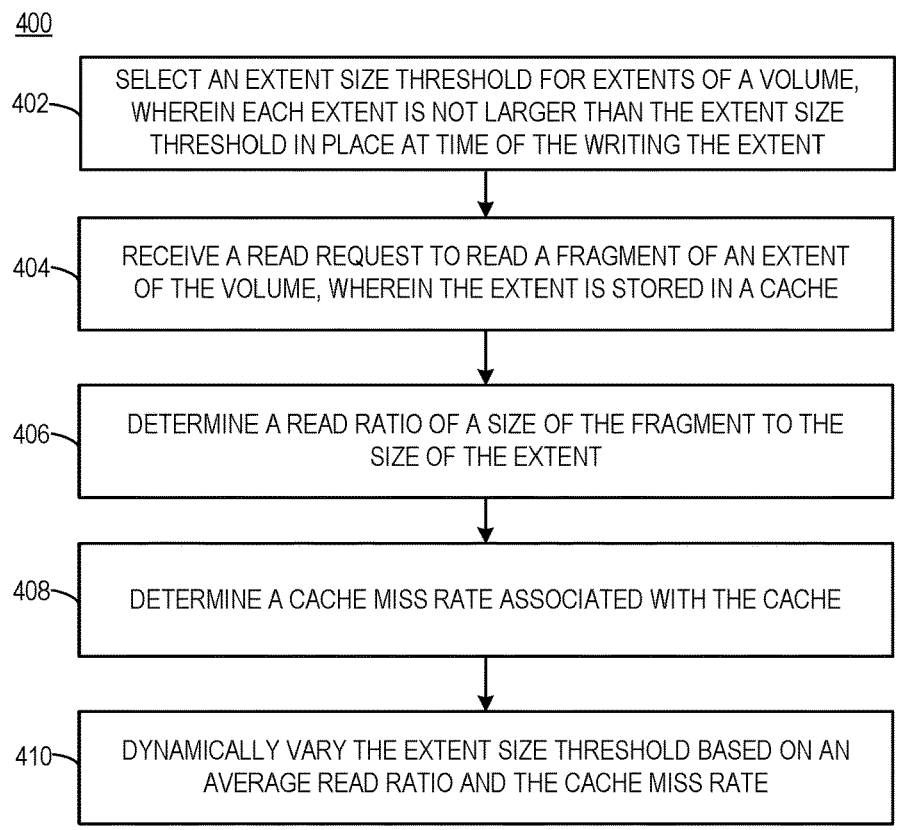
FIG. 4 is a flowchart of an example method to vary the extent size threshold based on the cache miss rate and the average read ratio.
Figure 5:
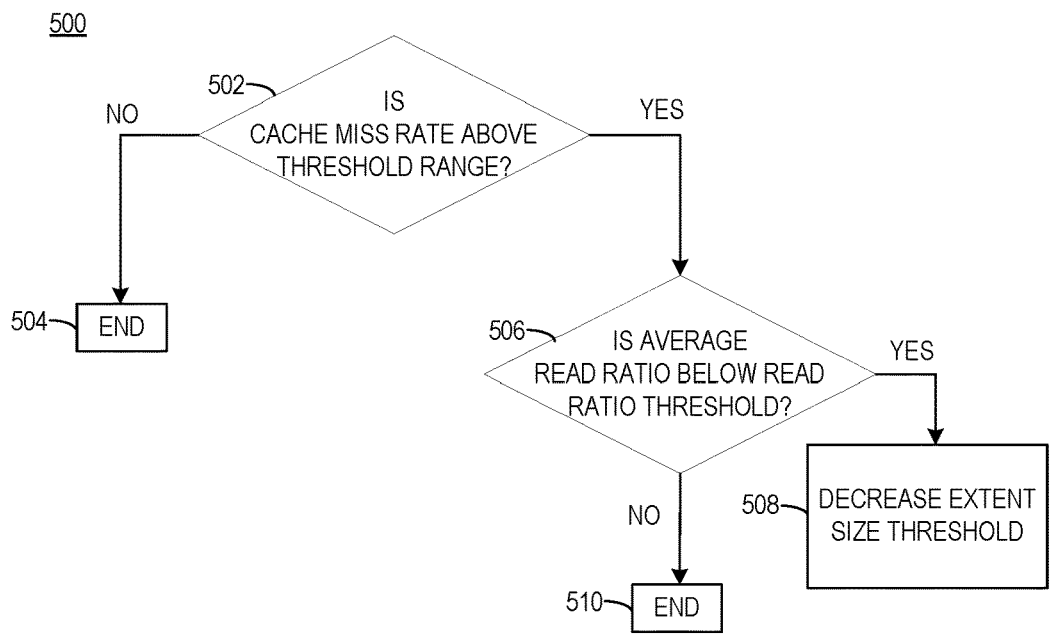
FIG. 5 is a flowchart of an example method to vary the extent size threshold based on the cache miss rate and the average read ratio.

Examples of varying the extent size threshold for a volume are described herein in relation to FIGS. 3, 4, and 5. FIG. 4 is a flowchart of an example method 400 to vary the extent size threshold for a volume according to cache miss rate.

At 402, the processing resource 306 may execute instructions 318 to select an extent size threshold for a volume based on a type of application that is to store data on the volume. The extent size of each extent in the volume may not be greater than the extent size threshold in place at the time of writing the extent to the volume. The processing resource 306 may select the extent size threshold for the volume as described in relation to FIGS. 1A, 2A, and 2B. For example, the processing resource 306 may determine that the type of application associated with the volume 328-2 is a database application type. Accordingly, the processing resource 306 may select extent size threshold of 64 KB (as in examples described above).

At 404, the processing resource 306 may execute instructions 320 to receive a read request 340 to read a fragment of an extent of the volume, where the extent is stored in the cache memory 310. The read request may specify a volume identifier and a logical address in a volume. For example, the read request 340 may specify the volume identifier of the volume 328-2 and an offset address and offset length to read a fragment of an extent contained in the volume 328-2. The offset address may indicate location in logical address space of the volume and the offset length may correspond to a size of the fragment of the extent to be read. In the example of FIG. 3, the processing resource 306 receives a read request to read a fragment of an extent 332 stored in the cache memory. The size of the fragment to be read, or "fragment size", is indicated by "FS."

In some examples, one or more of the extents 330 may or may not be stored in the cache memory 310. Accordingly, a "cache hit" or a "cache miss" may occur based on whether requested data is stored in the cache memory 310 or not. Cache hit occurs when the processing resource 306 searches the cache memory 310 for data and finds that data, while a cache miss occurs when the processing resource 306 searches the cache memory 310 for data and does not find that data. For example, the storage system 300 may receive a read request to read a fragment of the extent 332, which is stored in the cache memory 310. In such an example, the processing resource 306 searches and retrieves the data from the cache memory, and a cache hit is said to have occurred. In another example, the storage system 300 may receive a read request to read a fragment of the extent 334. The processing resource 306 may search for the data in the cache memory 310 and does not find the data. In such examples, a cache miss is said to have occurred.

At 406, the processing resource 306 may execute instructions 322 to determine a read ratio, which is a ratio of the fragment size (FS) of the fragment being read to the extent size ("ES") of the extent containing the fragment, and which may be expressed as FS/ES. For example, if the fragment size (FS) is 64 KB and the size of extent containing the fragment (ES) is 128 KB, then the read ratio (FS/ES) is 64 KB/128 KB=0.5. In some examples, the processing resource 306 may monitor the read ratio after each read operation.

At 408, the processing resource 306 may execute instructions 324 to determine a cache miss rate associated with the cache memory 310. For a given cache memory, the cache miss rate is a ratio of total cache misses to a total number of read requests received by the storage system over a time interval. Alternatively, in other examples, the processing resource may determine, for a cache memory, a cache hit rate, which is a ratio of total cache hits to the total number of read requests received by the storage system over a time interval.

At 410, the processing resource 306 may execute instructions 326 to dynamically vary the extent size threshold based on the average read ratio and the cache miss rate associated with cache memory. The average read ratio refers to an average of read ratio values computed for respective read requests received by the storage system. The average read ratio may be expressed as $$\text{Read ratio}_{avg} = \sum_{i=1}^{n} \frac{FS_i}{ES_i},$$

where 'i' represents a particular read request instance, 'n' represents the total number of read requests received, $FS_i$ represents the size of fragment to be read in response to a particular read request, $ES_i$ represents the size of extent containing the fragment in response to the read request. In some examples, the processing resource 306 may compare the average read ratio and the cache miss rate with respective thresholds and vary the extent size threshold accordingly.

FIG. 5 depicts a flowchart for an example method 500 to vary an extent size threshold based on a cache miss rate and an average read ratio. The method 500 may include steps 502, 504, 506, 508, and 510. A processing resource, such as the processing resource 306 may perform the steps 502, 504, 506, 508, and 510 by executing instructions of instructions 316. At 502, the processing resource 306 may determine whether the cache miss rate is above a cache miss rate threshold range or not. The cache miss rate threshold range may be a desired range of values for cache miss rate. For example, the cache miss rate threshold range may be 0 to 0.5. In other examples, the processing resource 306 may use other cache-related metrics, such as cache hit rate. For example, the processing resource 306 may determine whether a cache hit rate is below a cache hit rate threshold range.

In an example, the cache miss rate may be 0.40. In response to determining that the cache miss rate (0.40) is not above than the cache miss rate threshold range (0 to 0.5) ("NO" at 502), the method proceeds to 504. At 504, the processing resource 306 may not perform any action, i.e., may not vary the extent size threshold.

In another example, at 502, if the cache miss rate is greater than the cache miss rate threshold range ("YES" at 502), the method proceeds to 506. For example, the cache miss rate may be 0.60, which is greater than the threshold range (0 to 0.5). At 506, the processing resource 306 may determine whether the average read ratio is below a read ratio threshold or not. In an example, if the average read ratio is below the read ratio threshold ("YES" at 506), the method 500 proceeds to 508. At 508, the processing resource 306 may decrease the extent size threshold by a predetermined value (e.g., 32 KB). For example, the extent size threshold (e.g., 128 KB) may be decreased to 96 KB. By decreasing the extent size threshold for the volume, the sizes of fragments read from respective extents may (over time) be nearer to the sizes of the extents containing the read fragments. Additionally, the cache memory may cache a higher number of relatively small extents that include hot data instead of a fewer number of larger extents that may include larger amount of cold data and smaller amount of hot data. As a result, the cache memory capacity may be more efficiently utilized with minimal wastage. In this manner, cache misses in the storage system may be significantly reduced. In examples where the processing resource monitors the cache hit rate, the processing resource 306 may decrease the extent size threshold by a predetermined value in response to determining that a cache hit rate is less than a threshold range of cache hit rate and that the ratio is less than a threshold ratio.

In another example, the average read ratio may be greater than or equal to the read ratio threshold. In response to determining that the average read ratio is not below the read ratio threshold ("NO" at 506), the method proceeds to 510. At 510, the processing resource 306 may not perform any action, i.e., the processing resource 306 may not vary the extent size threshold.

Figure 6A:
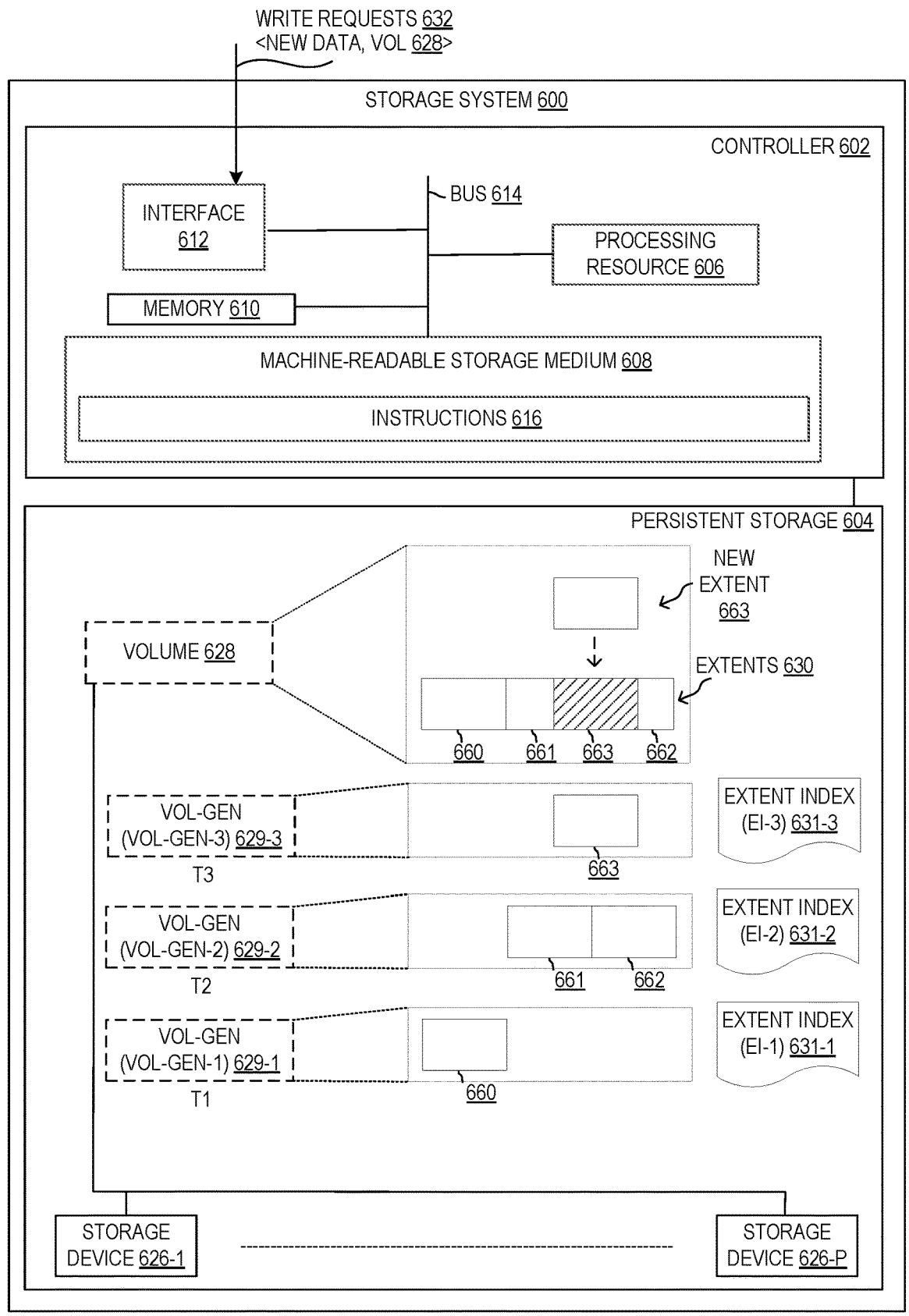
FIG. 6A is a block diagram of an example storage system to vary the extent size threshold for a volume based on an amount of dead storage space corresponding to partially overwritten extents.

FIG. 6A is a block diagram of an example storage system 600 to vary an extent size threshold for a volume based on an amount of dead storage space corresponding to partially overwritten extents of the volume. The storage system 600 may include a controller 602 and persistent storage 604. Controller 602 is a controller as described above in relation to controller 102 of FIG. 1A and persistent storage 604 is persistent storage as described above in relation to persistent storage 104 of FIG. 1A. As depicted in FIG. 6A, the controller 602 may include a processing resource 606, a machine-readable storage medium 608, a memory resource 610, a network interface device 612, and one or more busses 614. In the example of FIG. 6A, the machine-readable storage medium 608 may store (e.g., be encoded with) a plurality of instructions 616 that are executable by the processing resource 606 of the controller 602 to implement functionalities described herein.

In the example of FIG. 6A, the controller 602 may have a physical connection to the persistent storage 604, which may include physical storage devices 626-1 to 626-P (where "P" is an integer greater than or equal to 1). In some examples, the data stored on one or more of the storage devices 626-1 to 626-P is logically represented in the form of volumes. The controller 602 may present the volumes to one or more client computing devices (e.g., host servers) coupled to the storage system 600. A volume, such as a volume 628, may include a logical address space backed by one or more of the storage device(s) 626-1 to 626-P.

In examples described herein, data may be written to a volume as extents that are part of the same or different volume generations (or vol-gens) as described above. As noted above, each vol-gen may be created based on activity occurring during a respective epoch. The length of a given epoch may be based on the elapsing of a maximum amount of time, occurrence of an event (such as full utilization of a write buffer capacity in the storage system), or a combination thereof (e.g., whichever occurs first). In such examples, the lengths of time covered by different epochs may vary. A vol-gen may be in an "open" state during a corresponding epoch, and then switch to a "stable" state after completion of that epoch. While a given vol-gen is in the open state during a corresponding epoch, metadata for extents written during that epoch are associated with the given vol-gen (e.g., references to those extents are associated with an identifier for the given vol-gen). When the given vol-gen is in the stable state, metadata for extents written in a later epoch is no longer associated with the given vol-gen. In some examples, a vol-gen in a stable state may be used to create a point-in-time version (e.g., snapshot) of a volume associated with the vol-gen.

As depicted in FIG. 6A, the processing resource 606 creates vol-gens 629-1, 629-2, 629-3 of the volume 628 at the beginning of the epochs T1, T2, T3, respectively. Each of the vol-gens 629-1, 629-2, 629-3 may be associated with one or more of the extents 630 written to the volume 628 at T1, T2, and T3, respectively. Extents 630 may include extents 660, 661, 662, and 663 written to the volume 628 as part of different vol-gens 629-1, 629-2, 629-3 during corresponding epochs. For example, extent 660 may be written as part of vol-gen 629-1 during epoch T1, extents 661, 662 may be written as part of vol-gen 629-2 during epoch T2, and extent 663 may be written as part of vol-gen 629-3 during epoch T3. In some examples, the data may be stored in a log-structured filesystem, which is a sequential layout of all the data written to volumes of the storage system 600. For example, new data written to a volume do not overwrite existing data in place. Such new data are sequentially written in the log-structured filesystem and in persistent storage.

The vol-gens 629-1, 629-2, 629-3 may be identified using respective vol-gen identifiers, such as "VOL-GEN-1," "VOL-GEN-2," "VOL-GEN-3." For ease of illustration herein, vol-gen identifiers are represented with reference symbols having a format of "VOL-GEN-X," where "VOL-GEN-" is a prefix indicating a vol-gen identifier, and "X" is one or more numbers identifying a particular vol-gen. Although reference symbols of the form "VOL-GEN-X" are used herein for ease of illustration, examples described herein may use any suitable representation for the actual vol-gen identifiers (e.g., decimal representation, binary representation, hexadecimal representation, etc.).

Each vol-gen may be associated with a respective extent index. An extent index is a data structure that stores metadata, such as logical addresses (e.g., start offsets) and logical identifiers (e.g., extent identifiers) for each extent associated with a given vol-gen. In the example of FIG. 6A, the vol-gens 629-1, 629-2, 629-3 are associated with the extent indexes 631-1, 631-2, 631-3, respectively. In some examples, extent indexes may be structured in the form of trees (e.g., B+ tree, radix tree, or the like). Such a tree may include nodes, such as a root node, leaf nodes, intermediate nodes, arranged in a hierarchical manner. The creation of the vol-gens 629-1, 629-2, 629-3 and respective extent indexes 631-1, 631-2, 631-3 are described further in relation to FIGS. 6B-6N.

Figure 7:
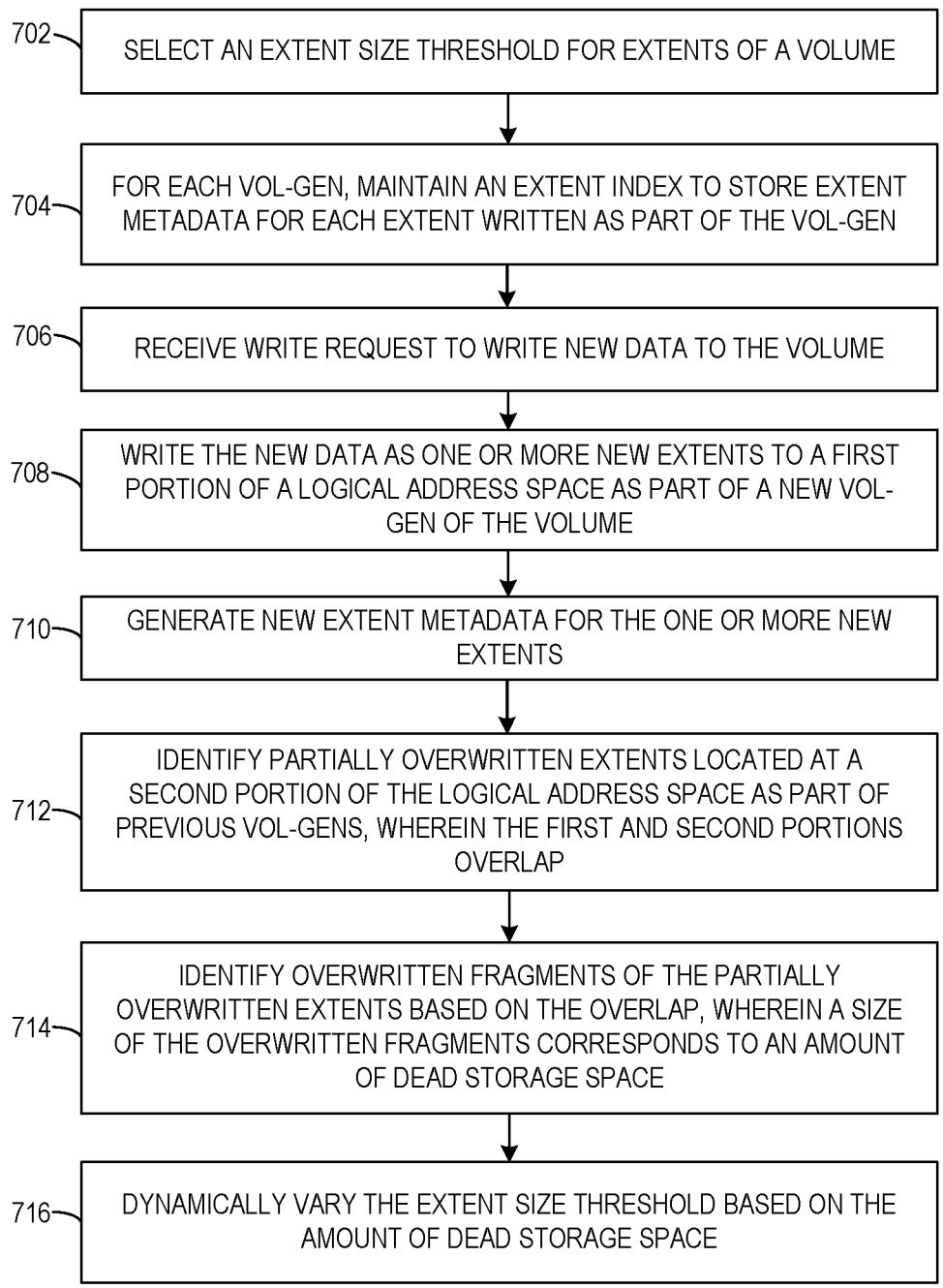
FIG. 7 is a flowchart of an example method to vary the extent size threshold for a volume based on the amount of dead storage space due to partial overwrites.

Examples of varying the extent size threshold for a volume are described herein in relation to FIGS. 6A-6N, 7, and 8. FIG. 7 is a flowchart of an example method 700 to vary the extent size threshold for a volume based on an amount of dead storage space corresponding to partially overwritten extents of the volume.

At 702, the processing resource 606 may execute instructions 616 to select an extent size threshold for a volume based on a type of application that is to store data on the volume. In some examples, the processing resource 606 may determine an application type associated with a volume (e.g., as a background operation), and select an extent size threshold for the volume accordingly. For example, if the processing resource 606 determines that the application type is database application, then the processing resource 606 may select an extent size threshold equivalent to 64 KB for the volume 628 (as described in relation to FIG. 1A).

In the example of FIG. 6A, the storage system 600 may receive a write request 632 to write data to a volume 628 during epoch T1. The write request may specify a logical address (e.g., start offset), a volume identifier (of the volume 628), and the data to be written to the volume 628. The processing resource 606 may write the data as an extent 660 as part of vol-gen 629-1 associated with the volume 628, such that the extent 660 begins at the offset indicated in the write request. For example, if the offset is location 1 (LOC 1), then the extent 660 may begin at a LOC 1 of the volume 628 as indicated in FIG. 6B. The size of the extent 660 may not be larger than the selected extent size threshold (e.g., 64 KB). In some examples, storage system 600 may use a log-structured filesystem 675 (see FIG. 6D) as part of the storage architecture for implementing the storage of data in volumes in storage system 600. The extent 660 may be written in the log-structured filesystem 675 during the epoch T1. After completion of the epoch T1, the vol-gen 629-1 may switch from open state to stable state of the volume 628.

After beginning epoch T2, the storage system 600 may receive another write request to write data to the volume 628. The processing resource 606 may segment the data into smaller units if the data is larger than the extent size threshold (i.e., 64 KB). For example, if the data is 128 KB, then the processing resource 606 may segment the data into two 64 KB data units. The processing resource 606 may write these data unit as a separate extents 661, 662 of the vol-gen 629-2, such that the first extent 661 begins at the offset indicated in the write request. For example, if the offset is location 65 (LOC 65), then the extent 661 may begin at LOC 65 and the extent 662 may begin at a location 129 (LOC 129) of the volume 628 immediately following extent 661 as indicated in FIG. 6E. As depicted in FIG. 6G, the extents 661 and 662 are sequentially written in the log-structured filesystem 675 during the epoch T2.

Referring back to FIG. 7, at 704, the processing resource 606 may execute instructions 616 to maintain an extent index for each vol-gen of the volume. An extent index for a vol-gen may store extent metadata for each extent associated with the vol-gen. In some examples, the extent metadata may include a logical address (e.g., start offset), a vol-gen identifier, an extent size, and an extent identifier associated with an extent. The start offset may indicate a location in the logical address space of the volume where the extent begins. The vol-gen identifier may indicate an identity of a vol-gen of an epoch during which the extent was written to the volume. The extent size may indicate an amount of storage space used to store the extent in the storage device(s) 626-1 to 626-P. The extent identifier may be a logical identifier that uniquely identifies the extent based on the data stored in the extent.

FIG. 6C depicts the extent index 631-1 for the vol-gen 629-1. The processing resource 606 may create the extent index 631-1 during the epoch T1. The extent index 631-1 may store metadata including a start offset 681, a vol-gen identifier 682, an extent size 683, and an extent identifier 684. The extent index 631-1 may include entries, each specifying metadata for a corresponding extent written during the epoch T1. For example, the extent index 631-1 may include an entry 691 specifying the metadata for the extent 660 written as part of the vol-gen 629-1 during epoch T1. For example, the start offset 681 for the extent 660 is location 1 (LOC 1) in the logical address space of the volume 628. The vol-gen identifier 682 may be VOL-GEN-1 (corresponding to the vol-gen 629-1, which is the vol-gen of the epoch T1 during which the extent 660 was written). The extent size 683 of the extent 660 may be 64 KB. The extent identifier 684 of the extent may be 1.

FIG. 6F depicts the extent index 631-2 for the vol-gen 629-2. The processing resource 606 may create the extent index 631-2 during the epoch T2. The extent index 631-2 may store metadata for the extents 661, 662 associated with the vol-gen 629-2, in addition to the extent 660 associated with vol-gen 629-1 of the epoch T1. The extent index 631-2 may include entries 691, 692, 693 specifying the metadata for the extents 660, 661, 662, respectively. For example, for the extent 660, the start offset 681 may be location 1 (LOC 1) in the logical address space of the volume 628, the vol-gen identifier 682 may be VOL-GEN-1 (corresponding to the vol-gen 629-1, which is the vol-gen of the epoch during which the extent 660 was written), the extent size 683 may be 64 KB, and the extent identifier 684 for the extent 660 may be 1. For the extent 661, the start offset 681 may be location 65 (LOC 65) in the logical address space of the volume, the vol-gen identifier 682 may be VOL-GEN-2 (corresponding to the vol-gen 629-2, which is the vol-gen of the epoch during which the extent 661 was written), the extent size 683 may be 64 KB, and the extent identifier 684 for the extent 661 may be 2. For the extent 662, the start offset 681 may be location 129 (LOC 129) in the logical address space of the volume, the vol-gen identifier 682 may be VOL-GEN-2 (corresponding to the vol-gen 629-2, which is the vol-gen of the epoch during which the extent 662 was written), the extent size 683 may be 64 KB, and the extent identifier 684 of the extent 662 may be 3.

Referring back to FIG. 7, at 706, the processing resource 606 may execute instructions 616 to receive a write request to write new data to the volume 628 in the next epoch T3 (i.e., after completion of the epoch T2). The write request may specify the new data, the volume identifier of the volume 628, and a start offset (e.g., LOC 97).

At 708, the processing resource 606 may execute instructions 616 to write the new data as a new extent as part of a new vol-gen associated with the volume 628. The processing resource 606 may write the new data as a new extent 663, which may begin from location 97 (LOC 97) of the logical address space of the volume 628, for example. As depicted in FIGS. 6H and 6I, the new data is written to the volume 628 as new extent 663.

At 710, the processing resource 606 may execute instructions 616 to generate new extent metadata for the new extent 663. The new extent metadata may include the logical address, vol-gen identifier, extent size, and extent identifier of the new extent. The processing resource 606 may obtain the logical address (LOC 97) of the new extent as specified in the write request. The processing resource 606 may determine that the extent size of the new extent is equivalent to the extent size threshold, for example. The extent size threshold may be 64 KB, for example. The processing resource 606 may assign an extent identifier to the extent based on the data contained in the extent. For example, if a duplicate copy of the data is already stored as an extent in the storage system, then the processing resource 606 may assign the extent identifier of that extent to the new extent. If a duplicate copy is not found, then the processing resource 606 may assign a new extent identifier.

The processing resource 606 may determine the vol-gen identifier identifying the vol-gen of epoch T3 during which the extent 663 was written. The processing resource 606 may determine that a new vol-gen 629-3, which may be in an "open state," as the vol-gen of epoch T3. In the open state of the vol-gen 629-3, metadata for the new extent 663 written during the epoch T3 are associated with the given vol-gen (e.g., references to the extent 663 are associated with an identifier for the vol-gen). After completion of the epoch T3, the processing resource 606 may change the state of the vol-gen 629-3 from the open state to a stable state. In the stable state, the vol-gen 629-3 and the extent index 631-3 may be stored in the memory 610 or in the persistent storage 604.

As depicted in FIG. 6K, the extent 663 is sequentially written to the log-structured filesystem 675 during the epoch T3. The log-structured filesystem 675 stores the extents 660, 661, 662, 663 (written to the volume) in a sequential manner.

In some examples, before changing the state of the vol-gen 629-3 from the open state to the stable state, the processing resource 606 may simultaneously initiate creation of an extent index 631-3 for the vol-gen 629-3. In some examples, the processing resource 606 may create the extent index 631-3 by updating the extent index 631-2, which was created at the completion of epoch T2, to include the metadata for the new extent 663 (e.g., via a merge operation of the tree structure of the extent index 631-2). FIG. 6J depicts the extent index 631-3 storing the start offset 681, vol-gen identifier 682, extent size 683, and extent identifier 684 for the extents 660, 661, 662, 663. The extent index 631-3 may include entries 691, 692, 693, 694 specifying the metadata for the respective extents 660, 661, 662, 663 referenced by the vol-gen 629-3.

For the extent 660, the start offset 681 may be location 1 (LOC 1) in the logical address space of the volume 628, the vol-gen identifier 682 may be VOL-GEN-1 (corresponding to the vol-gen 629-1, which is the vol-gen of the epoch T1 during which the extent 660 was written), the extent size 683 may be 64 KB and the extent identifier 684 may be 1. Likewise, for the extent 661, the start offset 681, vol-gen identifier 682, extent size 683, and extent identifier 684 may be location 65 (LOC 65), VOL-GEN-2 (corresponding to the vol-gen 629-2, which is the vol-gen of the epoch T2 during which the extent 661 was written), 32 KB, and 2, respectively. For the extent 663, the start offset 681 may be location 97 (LOC 97) in the logical address space of the volume 628, the vol-gen identifier 682 may be VOL-GEN-3 (corresponding to the vol-gen 629-3, which is the vol-gen of the epoch T3 during which the extent 663 was written), the extent size 683 may be 64 KB, and the extent identifier 684 may be 4. Likewise, for the extent 662, the start offset 681, vol-gen identifier 682, extent size 683, and extent identifier 684 may be location 161 (LOC 161), VOL-GEN-2 (corresponding to the vol-gen 629-2, which is the vol-gen of the epoch T2 during which the extent 662 was written), 32 KB, and 3, respectively.

Referring back to FIG. 7, at 712, after completion of the epoch T3, the processing resource 606 may execute instructions 616 to identify one or more partially overwritten extents that are associated with one or more earlier vol-gens (e.g., vol-gen 629-1 and vol-gen 629-2) of the volume based on the new extent metadata and the extent metadata stored in the extent index 631-2 for a preceding vol-gen, i.e., vol-gen 629-2. In some examples, the processing resource 606 may identify a partially overwritten extent by determining an overlap between extents of the different vol-gens based on a comparison of the corresponding entries in the extent indexes 631-3 and 631-2. For example, the processing resource 606 may determine the overlap by comparing the start offsets, the extent sizes, the extent identifiers specified in the extent index 631-3 with the start offsets, the extent sizes, and the extent identifiers of the extent index 631-2. The processing resource 606 may determine such overlaps if the metadata values specified in the corresponding entries are different (i.e., do not match). For example, in the entries 691 of the extent indexes 631-3 and 631-2, the start offsets, extent sizes, and extent identifier values (i.e., LOC 1, 64 KB, 1) for the extent 660 match. A match of the entries 691 in the extent indexes 631-2 and 631-3 may indicate that the extent 660 does not overlap with another extent, and is therefore not partially overwritten.

The processing resource 606 may compare the entries 692 of the respective extent indexes 631-2, 631-3 and determine that the entries 692 include same start offset (i.e., LOC 65), same extent identifiers (i.e., 2), but different extent sizes (64 KB in extent index 631-2 and 32 KB in extent index 631-3). Such a mismatch in the extent sizes may indicate that extent corresponding to the entry 692 in the extent index of the preceding vol-gen (i.e., extent index 631-2) is partially overwritten. For example, the extent 661 in the volume 628 may be partially overwritten by the extent 663.

Similarly, the processing resource 606 may compare the entries 693 of the extent indexes 631-2, 631-3 and determine that the entries 693 include different start offsets (i.e., LOC 129 in extent index 631-2 and LOC 97 in extent index 631-3), different extent identifiers (i.e., 3 in extent index 631-2 and 4 in extent index 631-3). Such a mismatch in the start offset and the extent identifiers indicate that extent corresponding to the entry 693 in the extent index of the preceding vol-gen (i.e., extent index 631-2) is partially overwritten. For example, the extent 662 in the volume 628 may be partially overwritten by the extent 663.

Referring back to FIG. 7, at 714, the processing resource 606 may execute instructions 616 to identify overwritten fragments of the partially overwritten extents and determine an amount of dead storage space, which corresponds to a cumulative size of the overwritten fragments. The overwritten fragments may correspond to the overlapping region of the new extent 663 and the partially overwritten extents 661, 662. The processing resource 606 may determine the size of the overlapping regions by comparing the metadata for the new extent 663 with the metadata for the partially overwritten extents 661, 662 (identified at 714).

As depicted in FIG. 6J, the metadata for the new extent may be indicated in the entry (entry 693) of the extent index 631-3. The processing resource 606 may determine that the new extent 663 (associated with the vol-gen 629-3) ranges from location 97 (LOC 97) to location 161 (LOC 161) of the logical address space of the volume 628. The processing resource 606 may determine that, in the volume 628, at the portion of the logical address space from location 97 (LOC 97) to location 161 (LOC 161), the new extent 663 overlaps with the fragments of extents 661, 662. For example, the overwritten fragments between LOC 97 and LOC 161 include a fragment of the extent 661 and a fragment of the extent 662. The processing resource may determine that the size of the overlap is 64 KB based on the extent size and non-overwritten fragments of the partially overwritten extents. As a result, the overwritten fragments between LOC 97 and LOC 161 may correspond to 64 KB of dead storage space. A cumulative size of all the overwritten fragments in the volumes of the storage system 600 may correspond to an amount of dead storage space in the log structure file system 675.

Referring back to FIG. 7, at 716, the processing resource 606 may execute instructions 616 to dynamically vary the extent size threshold based on the amount of the dead storage space. For example, the processing resource 606 may compare the amount of dead storage space with a threshold range of values for dead storage space. The processing resource 606 may perform the comparison periodically (e.g., when a new vol-gen and associated extent index is created). The processing resource 606 may decrease the extent size threshold for the volume when an excessive amount of dead storage space is detected, for example.

Figure 8:
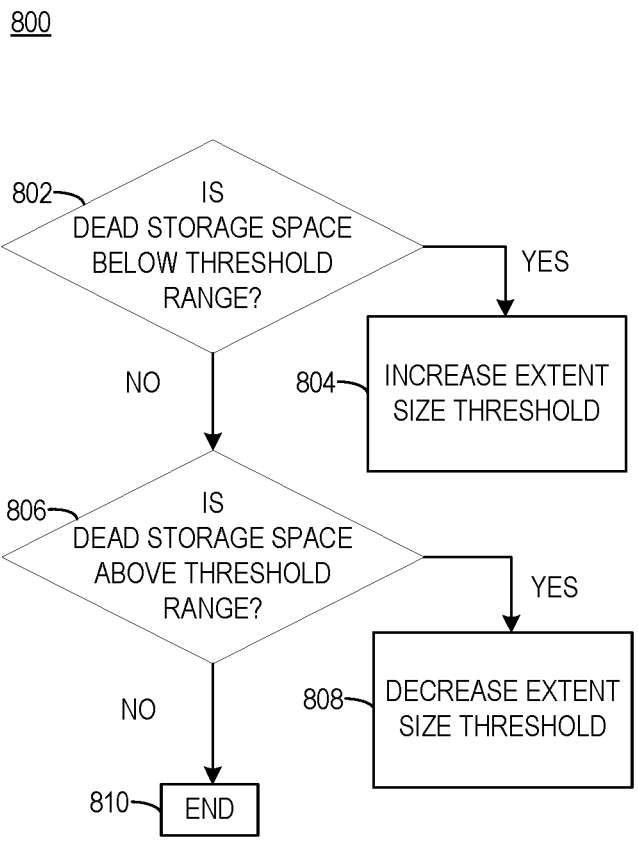
FIG. 8 is a flowchart of an example method to vary the extent size threshold for the volume based on the amount of dead storage space.

FIG. 8 is a flowchart of an example method 800 to vary the extent size threshold based on the amount of dead storage space. The method 800 may include steps 802, 804, 806, 808, and 810. A processing resource, such as the processing resource 606 may perform the steps 802, 804, 806, 808, and 810 by executing instructions of instructions 616. The extent size threshold for a volume, such as a volume 628 may be 64 KB, for example. At 802, the processing resource 606 may determine whether the amount of dead storage space is below a threshold range of values for dead storage space. The threshold range may be a range of 0.5 terabytes (TB) to 1.5 TB, for example.

In an example, the amount of dead storage space may be equivalent to 0.1 TB. In such an example, the processing resource 606 may determine that the amount of dead storage space is below the threshold range, i.e., 0.5 TB to 1 TB, the method proceeds to 804 ("YES" at 802). At 804, the processing resource 606 may increase the extent size threshold by a predetermined value (e.g., 32 KB). For example, the extent size threshold may be increased from 64 KB to 96 KB. By increasing the extent size threshold in this manner, the storage system 600 may subsequently store data to the volume in larger extents. This may reduce the number of extents written to the volume, which in turn reduces the amount of extent metadata to be stored in the storage system, which may lead to significant savings in the amount of storage space.

In another example, the amount of dead storage space may be equivalent to 1.2 TB. In such an example, at 802, the processing resource 606 may determine that the amount of dead storage space is not below the threshold range ("NO" at 802), the method may proceed to 806. At 806, the processing resource 606 may determine whether the dead storage space is above the threshold range. In response to determining that the amount of dead storage space is above the threshold range ("YES" at 806), the method proceeds to 808. At 808, the processing resource 606 may decrease the extent size threshold by a predetermined value (e.g., 32 KB). For example, the extent size threshold may be decreased from 64 KB to 32 KB. By decreasing the extent size threshold in this manner, the storage system 600 may store new data to the volume as smaller extents. Due to such smaller extents, a relatively higher number of extents associated with earlier vol-gens may fully overlap with extents associated with later vol-gens of that volume. In such instances, extents of the earlier vol-gens that fully overlap with extents of later vol-gens may be considered as fully overwritten extents. Increasing the number of fully overwritten extents and reducing the number of partially overwritten extents in this manner, may lead to larger amount of overwritten data that may be erased (e.g., via a garbage collection process) from persistent storage. As a result, a relatively large amount of storage space in the persistent storage may be freed and the amount of dead storage space may be significantly reduced.

In another example, the amount of dead storage space may be equivalent to 0.7 TB. In response to determining that the amount of dead storage space is neither below the threshold range nor above the threshold range ("NO" at 806), the method proceeds to 810. At 810, the processing resource 606 may not perform any action, i.e., the processing resource 606 may not vary the extent size threshold.

In the examples described herein, the phrase "based on" is not exclusive and should not be read as "based exclusively on." Rather, the phrase "based on" as used herein is inclusive and means the same as the alternative phrasing "based at least on" or "based at least in part on." As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" or a "computing system" may be a server, storage device, storage array, desktop or laptop computer, switch, router, or any other processing device or equipment including a processing resource. In certain examples, the computing device may be or may include virtualized computing device (e.g., a virtual machine or a containerized application) executing on hardware. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1A, 3, and 6A, storage medium 108, 308, 608 may be implemented by one machine-readable storage medium, or multiple machine-readable storage media. Moreover, in certain examples, where the computing device may be a virtual machine or a containerized application, the processing resource and the machine-readable medium may represent a processing resource and a machine-readable medium of the hardware or a computing system that hosts the computing device as the virtual machine or the containerized application.

In the examples described herein, a storage array may be a computing device comprising a plurality of storage devices and one or more controllers to interact with host devices and control access to the storage devices. In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In the examples described herein, such combinations of hardware and programming may be implemented in a number of different ways. For example, the programming for the engines may be processor-executable instructions stored on at least one non-transitory machine-readable storage medium, and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In the examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract, and drawings), and/or all of the elements of any method or process so disclosed, may be combined in any combination, except combinations where at least some of such features and/or elements are mutually exclusive. For example, functionalities described herein in relation to any of FIGS. 1A-8 may be provided in combination with functionalities described herein in relation to any other of FIGS. 1A-8.

What is claimed is:

1. A method of a storage system, comprising:
   selecting, by the storage system, an extent size threshold for a volume, the selection based on a type of application that is to store data on the volume, wherein the extents are variable-sized units of data;
   receiving a write request including new data and a volume identifier of the volume to which to write the new data;
   writing the new data to the volume as one or more extents that are each no larger than the extent size threshold in place when the new data is written; and
   dynamically varying the extent size threshold based on data reduction metrics associated with the volume, comprising at least one of:
      in response to determining that a deduplication ratio is below a threshold deduplication ratio range, decreasing the extent size threshold by a predetermined value; or
      in response to determining that the deduplication ratio is above the threshold deduplication ratio range, increasing the extent size threshold by a predetermined value.

2. The method of claim 1, further comprising:
in response to determining that the type of the application is a database application, selecting a first extent size threshold; and
in response to determining that the type of the application is not the database application, selecting a second extent size threshold, wherein the first extent size threshold is greater than the second extent size threshold.

3. The method of claim 1, wherein writing the new data to the volume as one or more extents comprises:
in response to determining that a size of the new data is less than or equal to the extent size threshold, writing the new data to the volume as an extent, wherein an extent size of the extent corresponds to the size of the new data.

4. The method of claim 1, wherein writing the new data as one or more extents of the volume comprises:
in response to determining that the new data is larger than the extent size threshold, writing the new data as multiple extents, wherein each of the multiple extents is no larger than the extent size threshold.

5. A method of a storage system, comprising:
selecting, by the storage system, an extent size threshold for a volume, the selection based on a type of application that is to store data on the volume, wherein the extents are variable-sized units of data;
receiving a write request including new data and a volume identifier of the volume to which to write the new data;
writing the new data to the volume as one or more extents that are each no larger than the extent size threshold in place when the new data is written; and
dynamically varying the extent size threshold based on data reduction metrics associated with the volume, comprising at least one of:
in response to determining that the compression ratio is below a threshold compression ratio range, increasing the extent size threshold by a predetermined value; or
in response to determining that the compression ratio is above a threshold compression ratio range, decreasing the extent size threshold by a predetermined value.

6. An article comprising at least one non-transitory machine-readable storage medium comprising instructions executable by at least one processing resource of a storage system to:
select an extent size threshold for a volume, the selection based on a type of application that is to store data on the volume, wherein the extents are variable-sized units of data, and wherein each extent is no larger than the extent size threshold in place when the extent is written;
receive a read request to read a fragment of an extent of the volume, wherein the extent is stored in a cache;
in response to the read request:
determine a read ratio of the size of the fragment to the size of the extent; and
determine a cache miss rate associated with the cache; and
dynamically vary the extent size threshold based on an average read ratio and the cache miss rate.

7. The article of claim 6, wherein the instructions to dynamically vary the extent size threshold based on the average read ratio and the cache miss rate further comprising instructions to:
in response to determining that the cache miss rate is greater than a cache miss rate threshold and that the average read ratio is less than a threshold ratio, decrease the extent size threshold by a predetermined value.

8. The article of claim 6, wherein the instructions to dynamically vary the extent size threshold based on the average read ratio and the cache miss rate further comprising instructions to:
in response to determining that the cache miss rate is less than a cache miss rate threshold and that the average read ratio is greater than a threshold ratio, increase the extent size threshold by a predetermined value.

9. The article of claim 6, further comprising instructions to:
dynamically vary the extent size threshold based on the average read ratio and a cache hit rate;
in response to determining that the cache hit rate is less than a cache hit rate threshold and that the average read ratio is less than a threshold ratio, decrease the extent size threshold by a predetermined value.

10. A storage system comprising:
persistent storage; and
at least one controller comprising at least one processing resource and at least one non-transitory machine-readable storage medium comprising instructions executable by the at least one processing resource to:
select an extent size threshold for a volume, the selection based on a type of application that is to store data on the volume, wherein the extents are variable-sized units of data, and wherein each extent is no larger than the extent size threshold in place when the extent is written;
for each volume generation (vol-gen) associated with the volume, maintain an extent index to store extent metadata for each extent written as part of the vol-gen;
in response to receiving a write request to write new data to the volume:
write the new data as one or more new extents to a first portion of a logical address space as part of a new vol-gen associated with the volume;
generate new extent metadata for the one or more new extents;
based on the new extent metadata and the extent index for a preceding vol-gen:
identify one or more partially overwritten extents located at a second portion of the logical address space as part of one or more previous vol-gens associated the volume, wherein the first portion overlaps with the second portion of the logical address space; and
identify one or more overwritten fragments of the one or more partially overwritten extents based on overlap between the first portion and the second portion of the logical address space, wherein a cumulative size of the one or more overwritten fragments corresponds to an amount of dead storage space in the persistent storage; and
dynamically vary the extent size threshold based on the amount of dead storage space.

11. The storage system of claim 10, wherein the extent metadata and the new extent metadata for each extent includes one or more of a logical address, an extent identifier, an extent size, or a vol-gen identifier identifying a respective vol-gen that first referenced the extent.

12. The storage system of claim 11, wherein the extent index includes entries, and wherein each of the entries includes one or more of the logical address, the extent identifier, the extent size, or the vol-gen identifier associated with an extent referenced by the vol-gen.

13. The storage system of claim 12, wherein to identify the one or more partially overwritten extents, the at least one processing resource executes one or more of the instructions to:
   compare the new extent metadata with the extent metadata stored in the extent index of the preceding vol-gen; and
   in response to a mismatch between the new extent metadata and the extent metadata in the extent index, identify one or more of the extents of the previous vol-gens as the one or more partially overwritten extents in the volume.

14. The storage system of claim 13, wherein to identify the one or more overwritten fragments of the one or more partially overwritten extents, the at least one processing resource executes one or more of the instructions to:
   determine the overlap between the first portion and the second portion of the logical address space based on a comparison of respective logical addresses, respective vol-gen identifiers, and respective extent sizes; and
   identify the one or more overwritten fragments of the one or more partially overwritten extents based on the overlap.

15. The storage system of claim 14, wherein the at least one processing resource executes one or more of the instructions to:
   determine a size of each of the one or more overwritten fragments based on the logical address, the extent identifier, and the extent size of each of the one or more partially overwritten extents.

16. The storage system of claim 10, wherein to dynamically vary the extent size threshold based on the amount of dead storage space, the at least one processing resource executes one or more of the instructions to:
   in response to determining that the amount of dead storage space is above a threshold range, decrease the extent size threshold by a predetermined value; or
   in response to determining that the amount of dead storage space is below the threshold range, increase the extent size threshold by the predetermined value.

* * * * *